United States Patent [19]

Hodgkins et al.

[11] Patent Number: 4,506,026

[45] Date of Patent: Mar. 19, 1985

[54] LOW FIRING CERAMIC DIELECTRIC FOR TEMPERATURE COMPENSATING CAPACITORS

[75] Inventors: Charles E. Hodgkins, Lewiston; Daniel C. Rose, Ransomville, both of N.Y.; Dana L. Coller, Clemson, S.C.

[73] Assignee: TAM Ceramics, Inc., Niagara Falls, N.Y.

[21] Appl. No.: 564,885

[22] Filed: Dec. 23, 1983

Related U.S. Application Data

[63] Continuation-in-part of Ser. No. 452,160, Dec. 22, 1982, abandoned.

[51] Int. Cl.$^3$ .......................... C04B 35/46; H01B 3/12
[52] U.S. Cl. .................................... 501/135; 361/321; 501/136; 501/152
[58] Field of Search .................. 501/152, 135, 136; 361/320, 321, 322

[56] References Cited

U.S. PATENT DOCUMENTS

| | | | |
|---|---|---|---|
| 3,431,124 | 3/1969 | Hayashi et al. | 501/136 |
| 3,775,142 | 11/1973 | Roup | 501/136 |
| 3,787,219 | 1/1974 | Amin | 501/32 |
| 3,811,937 | 5/1974 | Maher | 501/139 |
| 3,819,990 | 6/1974 | Hayashi et al. | 501/138 |
| 3,885,941 | 5/1975 | Maher | 501/137 |
| 4,071,881 | 1/1978 | Bacher | 361/320 |
| 4,082,906 | 4/1978 | Amin et al. | 501/137 |
| 4,106,075 | 8/1978 | Baumann | 361/320 |
| 4,223,369 | 9/1980 | Burn | 361/321 |
| 4,242,213 | 12/1980 | Tamura et al. | 501/136 |
| 4,308,570 | 12/1981 | Burn | 361/321 |

FOREIGN PATENT DOCUMENTS

| | | | |
|---|---|---|---|
| 2641832 | 3/1978 | Fed. Rep. of Germany | 501/136 |
| 579868 | 8/1946 | United Kingdom | 501/136 |

OTHER PUBLICATIONS

Maher, G. H., "Improved Dielectrics for Multi-Layer Ceramic Capacitors", 27th Electronic Components Conference, Arlington, Va., (May 16–18, 1977), (pp. 391–399).

*Primary Examiner*—Helen M. McCarthy
*Attorney, Agent, or Firm*—Paul A. Leipold

[57] ABSTRACT

A low fired, temperature compensating dielectric composition is disclosed. The invention dielectric is formed of a base ceramic and a frit material. The base ceramic includes magnesium oxide, titanium oxide, calcium oxide, alumina, silica and at least one oxide of a rare element from the group of niobium, neodymium, tantalum, lanthanum, yttrium and praseodymium. The preferred oxides are those of niobium alone or with neodymium.

24 Claims, No Drawings

LOW FIRING CERAMIC DIELECTRIC FOR TEMPERATURE COMPENSATING CAPACITORS

This is a continuation-in-part of Ser. No. 452,160 filed Dec. 22, 1982, now abandoned.

TECHNICAL FIELD

The present invention relates to a low temperature firing dielectric ceramic composition. It particularly relates to ceramic compositions suitable for use in forming temperature compensated capacitors.

BACKGROUND OF THE INVENTION

In the ceramic capacitor field the capacitors are generally considered to be of three types. The Hi-K capacitors have a high dielectric constant of between about 4,000 and about 15,000, however the dielectric constant is generally not stable with changes in temperature. The second type is the Mid-K capacitor with a dielectric constant of between about 1,400 and about 2,200 and a non-linear change of dielectric constant with temperature change. The third types are the temperature compensating (TC) capacitors, with a dielectric constant between about 10 and about 90, having a small change in dielectric constant with temperature change. Further, the capacitance change is generally linear. There is a need for a TC capacitor that may be fired at low temperatures of below about 1150° C. There also is a need for TC capacitors with a low dielectric constant of between about 12 and about 20.

Multilayer ceramic capacitors are commonly made by casting or otherwise forming insulating layers of dielectric ceramic powder, placing thereupon conducting metal electrode layers, usually in the form of a metallic paste, stacking the resulting elements to form the multilayer capacitor, and firing to densify the material and form a solid solution of the constituent dielectric oxides. Barium titanate is one of the dielectric oxides frequently used in the formation of the insulating ceramic layer. Because of the high Curie temperature of barium titanate, however, strontium and zirconium oxides are commonly reacted with the barium titanate to form a solid solution, thereby reducing the Curie temperature of the resulting ceramic material. Certain other oxides, such as manganese dioxide, may also be added to control the dielectric constant of the resulting material by acting as a grain growth control additive.

Because the materials commonly used to produce temperature compensating ceramic capacitors are generally fired to maturity in air at temperatures greater than 1150° C., the metallic electrode layer must be formed from the less reactive, higher melting alloys of the so-called precious metals, such as palladium and silver, palladium and gold, and other similarly expensive alloys well-known in the art. This is necessary in order to prevent either reaction of the electrode with the insulating ceramic layer or melting which might result in discontinuities in the conducting layer. A method of producing a ceramic composition with a low dielectric constant and other suitable properties, which can be fired at temperatures below 1150° C., would permit the use of a less costly electrode material without sacrificing capacitor performance.

It has been proposed in U.S. Pat. No. 4,335,216 to Hodgkins et al that a low firing temperature dielectric composition be formed with a firing temperature of less than about 1150° C. The Hi-K ceramic composition disclosed therein has a low firing temperature and a high dielectric constant that varies with temperature. There remains a need for a temperature compensated type of dielectric that has a low dielectric constant, and low firing temperature.

In U.S. Pat. No. 4,106,075 to Baumann it is disclosed that a temperature compensated dielectric capacitor may be formed based on $TiO_2$ and/or $ZrO_2$ and/or compounds of $TiO_2$, $ZrO$, $Nb_2O_3$, and/or $Ta_2O_5$ with oxides of the alkali metals, alkaline earth metals or rare earth metals. The base ceramic is generally doped with a lead zinc borate or lead zinc calcium borate. However, this dielectric has a relatively high dielectric constant. The temperature compensating properties further are not desirable. The values if calculated on FIG. 1 are over 500 ppm.

DISCLOSURE OF THE INVENTION

An object of this invention is to overcome disadvantages of previous ceramic dielectrics.

Another object of this invention is to form a low firing ceramic dielectric.

Another further object of this invention is to form a temperature compensating ceramic dielectric with a low dielectric constant.

An additional object is to form a temperature compensating dielectric suitable with electrodes of about 70 percent silver and 30 percent by weight palladium.

These and other objects of the invention are generally accomplished as the invention provides a novel dielectric that may be fired at low temperatures and forms a dielectric that has temperature compensating properties. The invention dielectric has a composition formed of a base ceramic and a frit material. The base ceramic includes magnesium oxide, titanium oxide, calcium oxide, alumina, silica and at least one oxide of a rare element from the group niobium, neodymium, tantalum, lanthanum, yttrium and praseodymium. The preferred oxides are those of niobium alone or with neodymium. The glass frit in an amount between about 7 and 9 weight percent serves to promote sintering of the base ceramic during firing. The glass frit preferably comprises zinc oxide, silicon dioxide, boron oxide, lead oxide, bismuth trioxide and cadmium oxide.

MODES FOR CARRYING OUT THE INVENTION

The dielectric of the invention has numerous advantages over prior art compositions. The low firing saves energy costs. The low firing of the invention allows use of silver - palladium electrodes which have about 70% silver and only about 30% palladium content in the conducting layers in multilayer capacitors. This is desirable because palladium, a precious metal, is considerably more expensive than silver. The ceramic compositions of the invention further allow the control of the positive or negative slope of the curve which results from the plotting of the change of capacitance with the change in temperature. A change in capacitance properties is possible with a small change in composition. The capacitors formed by the invention composition have change of capacitance in the range of ±100 ppm between −55° C. and +125° C. and preferably a change of ±30 ppm in that range.

The major component of the ceramic composition of the invention is a base ceramic preparation of dielectric oxides. Based on total ceramic composition weight including frit, the base ceramic comprises about 28 to about 36 weight percent magnesium oxide, about 31 to about 39 weight percent titanium oxide, about 1 to about 4 weight percent calcium oxide, about 3 to about 5 weight percent alumina, about 12 to about 16 weight percent silica and the oxide of at least one rare element from the group niobium, neodymium, tantalum, lanthanum, yttrium and praseodymium. The preferred rare element oxides are niobium and neodymium in an amount between about 1 and 3 weight percent. A preferred amount of magnesium oxide is between about 31 and 35 weight percent. A preferred amount of calcium oxide is between about 1.5 and about 3 percent by weight. A preferred amount of silica is between about 12 and 16 parts by weight. An optimum composition of the base ceramic is about 32.7 weight percent magnesium oxide, about 36.1 weight percent titanium oxide, about 2.4 weight percent calcium oxide, about 3.8 weight percent alumina, about 15.0 weight percent silica, about 1.4 parts by weight niobium oxide and about 0.6 parts by weight neodymium as this composition is suitable for use in forming a low firing body and has a dielectric constant (K) of about 16 and maintains its capacitance value within 30 ppm per degree Centigrade in the temperature range of −55° C. to 125° C. The ppm/C° change relative to the 25° C. temperature and capacitance is equal to:

$$\frac{\frac{\text{change in capacitance (picofarads)}}{\text{change in temperature (Centigrade)}} \times 10^6}{\text{capacitance at 25°C. (picofarads)}} = \frac{\text{parts per million}}{\text{degree Centigrade}}$$

Any corrosive frit may be utilized that will aid in liquid phase sintering of the base ceramic without detriment to the electrical properties. Typical of liquid phase sintering aids are those of U.S. Pat. No. 4,081,857 to Hanold III. A suitable glass frit minor component comprises zinc oxide, silicon dioxide, boron oxide, lead oxide, bismuth trioxide and cadmium oxide. The compositional ranges of the components of the preferred glass frit are zinc oxide from about 5 to 10 weight percent, silicon dioxide from about 5 to 10 weight percent, boron oxide from about 9 to about 15 weight percent, lead oxide from about 35 to about 45 weight percent, bismuth trioxide from about 15 to about 25 weight percent and cadmium oxide from about 10 to about 19 percent.

The preferred proportions for the components of the glass frit are zinc oxide from about 7 to about 8 weight percent, and especially about 7.4 weight percent; silicon dioxide from about 7.5 to about 8.5 weight percent, and especially about 7.9 weight percent; boron oxide from about 13 to about 14 weight percent, and especially about 13.6 weight percent; lead oxide from about 39 to about 40 weight percent, and especially about 39.5 weight percent; bismuth trioxide from about 15.5 to about 16.5 weight percent, and especially about 15.8 weight percent; and cadmium oxide from about 15.5 to about 16.5 weight percent, and especially about 15.8 weight percent.

In a suitable combination the base ceramic comprises about 91 to about 93 weight percent and the glass frit comprises from about 7 to about 9 weight percent. The preferred amount of frit is about 8 percent by weight for good sintering and the desired dielectric properties.

The preferred compositions of the invention when formed into a multilayer structure have a dielectric constant (K) of about 12 to about 20 and a preferred range of 14–18 permits tighter capacitance distribution in multilayer ceramic capacitors, and therefore fewer defect rejections. Their dissipation factor is typically between about 0.01 and 1.0 percent at 1.0 Vrms.

The fired ceramic body of the present invention is produced by reacting during the course of firing the constituent dielectric oxides of the base ceramic preparation which may be magnesium titanate containing a small amount alumina, calcium titanate, colloidal silica, niobium oxide and neodymium oxide with a small amount of glass frit which comprises zinc oxide, silicon dioxide, boron oxide, lead oxide, bismuth trioxide, and cadmium oxide. The oxides of the base ceramic preparation may be included as the titanates. The combined oxides may also be formed from any reaction which will produce them, e.g., the calcining of an oxide precursor, such as a carbonate or nitrate with other constituent oxides or their precursors.

The base ceramic preparation may be calcined at a temperature between about 900° C. and about 960° C. prior to mixing with the glass frit in order to drive off volatiles, prereact the oxide precursors, and densify the individual grains, thus slightly densifying the resultant material and controlling the surface area and size of the particles. Although a low temperature fired ceramic with basically the same characteristics may be prepared without heat treating, heat treatment before mixing with the glass frit may be necessary if non-oxide precursors such as carbonates, nitrates or hydrates are used in substantial amounts.

Prior to mixing with the base ceramic preparations, the admixture of the oxides comprising the glass frit is melted, fritted in cold water, and reground. The density of the preferred glass frit of the invention is about 5.4 g/cm$^3$. Although the surface area and the particle size of the particles of the reground glass frit are not critical, the surface area should be between about 1 meter squared/gram (m$^2$/g) and about 4m$^2$/g, and preferably about 2.5 m$^2$/g, and the size of the particles should be between about 0.8 microns and about 2.5 microns in effective diameter, and preferably about 1.3 microns. These values are about the same as the values for the density, surface area and particle size of the base ceramic preparation.

In accordance with the present invention, even though the discrete particles of the dielectric constituents of the base ceramic preparation have not been presintered to form a solid solution, densification occurs when the glass frit particles are mixed with the base ceramic preparation powder and the blended powders are compacted or formed into multilayer capacitors and heated to the liquidus of the glass phase of the frit material. Because the compressive forces of densification are highest at the points of contact between the discrete particles of the dielectric constituents, dissolution at the solution-solid interface results in the diffusion of ions through the liquids phase to form a solid solution of the oxide constituents of the base ceramic preparation without the necessity for presintering to form the solid solution at elevated temperatures, i.e., 1300° C. to 1500° C. The densification, sintering and solid solution formation according to the present invention take place at temperatures between about 1000° C. and about 1150° C. The preferred firing temperature is about 1110° C. The firing time is between about 60 minutes and about 240 minutes and is preferably about 180 minutes.

In the invention, the proportions of the ingredients of the base ceramic compositions are chosen to maximize the desired physical and electrical properties. The alumina and silica aid in glass formation in the sintering, but if utilized in too large a quantity may change the dielectric constant. The amount of niobium and neodymium may be adjusted to maximize the insulation resistant properties. The ceramic of the invention has a small grain size and variations in the starting materials and length of firing are made to achieve small uniform grain size.

The ability to control the slope of the capacitance curve of the dielectrics of the invention is an advantage. The ratio of calcium oxide to magnesium oxide may be varied to change the slope of the capacitance curve. As the calcium oxide is increased and magnesium oxide decreased the curve rotates clockwise to exhibit a more negative slope. As the magnesium oxide is increased and calcium oxide decreased the curve rotates counterclockwise to exhibit a more positive slope.

In preparing the base ceramic preparation used in the invention, the constituent oxides in the proportions set forth above may be slurried together in water. After drying, the mixture may be heat treated as set forth above, dry blended with the glass frit composition, cast into a sheet using standard methods, formed into a multilayer capacitor structure, by methods well known in art, with 70% silver -30% palladium electrodes, and fired at about 1100° C. for about three hours.

The low temperature ceramic of the invention when in a ten layer capacitor typically has an insulation resistance (IR) at 125° C. of between about 4,000 and about 5,000, for a one minute charge at 100 volts. The dissipation factor is less than about 0.1 percent at about 1.0 rms.

As stated above, the ability to form low fired temperature compensated dielectrics of low dielectric constant is of particular importance. It is of further importance that the change in dielectric constant varies with temperature in a linear manner and the direction of the change is predictable and controllable by composition changes. The change of ±30 ppm/C° allows the dielectric of the invention to meet an E.I.A. RS198 electrical standard known as "COG" which is a specification for electrical ceramics.

The invention is further illustrated by the following examples. Temperatures are in centigrade and parts and percentages are by weight unless otherwise indicated.

EXAMPLE 1

A glass frit powder was prepared by mixing 7.4 grams zinc oxide, 7.9 grams silicon dioxide, 24.3 grams boric acid, 39.5 grams lead oxide, 15.8 grams bismuth trioxide, and 15.8 grams cadmium oxide. The mixture was melted, fritted in cold water, and pulverized.

A base ceramic was prepared by mixing 80.2 parts TAM TICON 75 grade of magnesium titanate containing about 11 weight percent silica and about 5 weight percent of alumina added, 5.8 parts TAM TICON 65 grade calcium titanate, 4 parts colloidal silica (Cab-O-Sil) of less than 1.5 micron, 1.44 niobium oxide from Fansteel milled to less than about 1.5 micron and 0.56 parts hydrated neodymium oxide that had been hydrated in water at greater than 50° C. for about 10 hours. The materials are wet mixed in a Premier Dispersator for about one half hour at about 58 percent solids. The base material was dried and calcined at about 1900° F. for 2 hrs. and pulverized. Then 8 parts by weight of the above frit is added and the mixture is jar milled 4–5 hrs. at 60% solids. The materials are dried and then pulverized by a hammer and screen pulverizer to about 1.5 to 2.0 micron. A 30 gram sample of the mixture is damp mixed for about 5 minutes in a mortar and pestle with 2 ml of water and 4 ml of corn syrup binder, dried and granulated through a 40 mesh screen. Discs about 1.27 centimeters in diameter and about 0.07 centimeters thick are pressed at a pressure of about 38,000 psi. The discs are placed on a stabilized zirconia setter and fired at a temperature of 1110° C. for 3 hours. After cooling, silver electrodes are painted on the discs and they are fired at about 850° C. in order to sinter the electrodes. The averaged properties of samples of each Example are listed in Table 1 below. It is apparent that an excellent low dielectric constant, thermal compensating capacitor has been formed.

The base ceramic composition portion of the complete capacitor expressed in weight percent of the complete capacitor in oxides is about 32.7 weight percent $MgO$, about 36.1 weight percent $TiO_2$, about 2.4 weight percent $CaO$, about 3.8 weight percent $Al_2O_3$, about 15.0 weight percent $SiO_2$, about 1.4 weight percent $Nb_2O_5$, and about 0.6 weight percent $Nd_2O_3$. The base ceramic forms about 92 percent by weight of the capacitor and the remaining about 8 percent by weight is the frit.

EXAMPLE 2

The procedure of Example 1 was repeated except that the materials comprised: 80.2 parts of the magnesium titanate, 5.8 parts of the calcium titanate, 8 parts of the frit, 4 parts of the colloidal silica, 1.12 parts of the neodymium oxide hydrate and 0.88 parts of the niobium oxide. This composition as shown in Table 1 also produces a good capacitor.

EXAMPLE 3

The procedure of Example 1 is repeated with the formulation: 79 parts of the magnesium titanate, 6 parts of the calcium titanate, 8 parts frit, 4 parts of the colloidal silica and 3 parts of the niobium oxide. This produces an excellent capacitor with properties as in the Table 1 below.

EXAMPLE 4

The procedure of Example 1 is repeated with the formulation: 80 parts of the magnesium titanate, 6 parts of the calcium titanate, 8 parts frit, 4 parts of the colloidal silica and 2 parts of the niobium oxide. This also produces a good capacitor as illustrated in Table 1 below.

EXAMPLE 5

The procedure of Example 1 was repeated with the composition as follows: 81 parts of the magnesium titanate, 6 parts of the calcium titanate, 8 parts of the frit, 4 parts of the colloidal silica and 1 part of the niobium oxide. A good capacitor is produced as illustrated in Table 1.

EXAMPLE 6

The procedure of Example 1 is repeated except the following composition is utilized: 80 parts of the magnesium titanate, 7 parts of the calcium titanate, 8 parts of the frit, 4 parts of the colloidal silica and 1 part of the niobium oxide. This also produces a good capacitor as illustrated in Table 1.

EXAMPLE 7 - Control

The procedure of Example 1 is repeated with the formulation: 85 parts of the magnesium titanate, 5 parts of the calcium titanate, 8 parts of the frit and 4 parts of the colloidal silica. This produces a capacitor with a positive capacitance slope as shown in Table 1. The insulation resistance is low and comparison with other examples indicates the advantage of niobium and neodymium in increasing insulation resistance.

EXAMPLE 8

The procedure of Example 1 is repeated with the composition: 78 parts of the magnesium titanate, 7 parts of the calcium titanate, 8 parts of the frit, 4 parts of the colloidal silica and 3 parts of the niobium oxide. This dielectric exhibits a negative capacitance curve. Comparison with Example 4 indicates that the decrease of magnesium titanate and the increase of calcium oxide from the calcium titanate causes the slope to become negative.

TABLE 1

| EX | TI | DI | CAPACITANCE IN pf ppm/degree C° | | | | | DF | K | IR |
| --- | --- | --- | --- | --- | --- | --- | --- | --- | --- | --- |
| | | | −55° | −30° | 25° | 85° | 125° | | | |
| 1 | .0242 | .4398 | 22.65 | 22.66 | 22.66 | 22.63 | 22.64 | .0004 | 16 | 1,381 |
| | | | +5.5 | 0 | 0 | −22 | −8.8 | | | |
| 2 | .0232 | .4388 | 23.36 | 23.37 | 23.41 | 23.38 | 23.39 | .0003 | 15.9 | 982 |
| | | | +27 | +31 | 0 | −21 | −9 | | | |
| 3 | .0220 | .4411 | 25.74 | 25.74 | 25.70 | 25.65 | 25.65 | .0003 | 15.7 | 175 |
| | | | −19 | −26 | 0 | −32 | −19 | | | |
| 4 | .0227 | .4402 | 23.91 | 23.91 | 23.88 | 23.86 | 23.85 | .0002 | 15.4 | 199 |
| | | | −16 | −21 | 0 | −14 | −12 | | | |
| 5 | .0234 | .4370 | 21.98 | 21.98 | 21.97 | 21.96 | 21.98 | .0003 | 14.8 | 77.3 |
| | | | +6 | +8 | 0 | +8 | +5 | | | |
| 6 | .0217 | .4406 | 26.05 | 26.02 | 25.96 | 25.91 | 25.91 | .0003 | 16.0 | 122 |
| | | | −43 | −38 | 0 | −32 | −19 | | | |
| 7* | .0212 | .4366 | 22.32 | 22.33 | 22.43 | 22.48 | 22.55 | .00036 | 13.8 | 27 |
| | | | +62 | +75 | 0 | +37 | +53 | | | |
| 8 | .0232 | .4406 | 25.24 | 25.20 | 25.13 | 25.07 | 25.06 | .0003 | 16.6 | 238 |
| | | | −55 | −46 | 0 | −40 | −28 | | | |

*Control
EX = Example
TI = Thickness in Inches
DI = Diameter in Inches
DF = Dissipation Factor
K = Dielectric Constant
IR = Insulation Resistance at 125° C. in Ohm-Farads

EXAMPLE 9

The composition of Example 1 is utilized to form a ten layer capacitor of 10 active layers with 0.08 square centimeters per layer by known techniques such as the method of Example 2 of U.S. Pat. No. 4,335,216. Electrodes are formed of about 70 percent silver and about 30 percent palladium. The multilayer capacitors are fired at about 1110° C. The properties are shown in Table 2 below for 3 samples. The temperature compensation properties are very good as are the IR values.

TABLE 2

| DF | 25° | CAPACITANCE IN pf ppm/degree | | | | | K | IR |
| --- | --- | --- | --- | --- | --- | --- | --- | --- |
| | | −55° | −30° | 25° | 85° | 125° | | |
| 1 .0006 | 394.2 | 394.7 | 394.4 | 394.2 | 394.3 | 394.6 | 16.2 | 4,341 |
| | | −15.8 | −9.2 | 0 | +4.2 | +10 | | |
| 2 .0006 | 396.1 | 394.5 | 394.2 | 394.0 | — | 394.9 | 16.3 | 4,344 |
| | | −15.8 | −9.2 | 0 | — | +22.8 | | |
| 3 .0006 | 392.9 | 393.2 | 393.0 | 392.9 | 393.2 | 393.5 | 16.2 | 4,722 |
| | | −9.5 | −4.6 | 0 | +12.7 | +15.3 | | |

K = Dielectric Constant
IR = Insulation Resistance 125° C. Ohm Farads
DF = Dissipation Factor The above description and examples are intended to be illustrative of the invention and not exhaustive as to variations within the scope of the attached claims. For instance, while the invention is described with certain sources of oxide materials for the frit and for the base ceramic material, it is within the invention to utilize other raw materials and other mixing methods. Further, it is within the invention to utilize other corrosive frit materials to aid liquid phase sintering. It is also possible that small amounts of non-reactive and non-functional filler materials could be present in the compositions of the base ceramic or frit materials.

We claim:
1. A dielectric ceramic composition comprising about 91 to about 93 weight percent of a base composition and about 7 to about 9 weight percent of a frit wherein said base composition, based on said ceramic composition weight, comprises about 28 to about 36 weight percent magnesium oxide, about 31 to about 39 weight percent titanium oxide, about 1 to about 4 weight percent calcium oxide, about 3 to about 5 weight percent alumina, about 12 to about 16 weight percent silica and about 1 to about 3 weight percent of the oxide of at least one rare element selected from the group consisting of niobium, tantalum, lanthanum, neodymium, yttrium and praseodymium.

2. The composition of claim 1 wherein said frit comprises about 5 to about 10 weight percent zinc oxide, from about 5 to about 10 weight percent silicon dioxide, from about 9 to about 15 weight percent boron oxide, from about 35 to about 45 weight percent lead oxide, from about 15 to about 25 percent bismuth trioxide, and from about 10 to about 19 weight percent cadmium oxide.

3. The composition of claim 1 wherein said magnesium oxide comprises between about 31 and about 35 weight percent.

4. The composition of claim 1 wherein said calcium oxide comprises between about 1.5 and about 3 weight percent.

5. The composition of claim 1 wherein said rare element is selected from the group consisting of niobium, neodymium and mixtures therof.

6. The composition of claim 1 wherein said base composition comprises about 32.7 weight percent magnesium oxide, about 36.1 weight percent titanium oxide, about 2.4 weight percent calcium oxide, about 3.8 weight percent alumina, about 15.0 weight percent silica, about 1.4 weight percent niobium oxide and about 0.6 weight percent neodymium oxide and wherein said frit comprises about 5 to about 10 weight percent zinc, from about 5 to about 10 weight percent silicon dioxide, from about 9 to about 15 weight percent boron oxide, from about 35 to about 45 weight percent lead oxide, from about 15 to about 25 weight percent bismuth trioxide and from about 10 to about 19 weight percent cadmium oxide.

7. A temperature compensating ceramic dielectric sintered at a temperature below about 1150° C. comprising about 91 to about 93 weight percent of a base composition and about 91 to about 93 weight percent of a base composition and about 7 to about 9 weight percent of a frit wherein said base composition consists essentially of about 28 to about 36 weight percent magnesium oxide, about 31 to about 39 weight percent titanium oxide, about 1 to about 4 weight percent calcium oxide, about 3 to about 5 weight percent alumina, about 12 to about 16 weight percent silica and about 1 to about 3 weight percent of the oxide of at least one rare element selected from the group consisting of niobium, neodymium, tantalum, lanthanum, yttrium and praseodymium, of said temperature compensating ceramic dielectric.

8. The dielectric of claim 7 wherein said frit consists essentiallly of about 5 to about 10 weight percent zinc oxide, from about 5 to about 10 weight percent silicon dioxide, from about 9 to about 15 weight percent boron oxide, from about 15 to about 25 weight percent bismuth trioxide, from about 35 to about 45 weight percent lead oxide, and from about 10 to about 19 weight percent cadmium oxide.

9. The dielectric of claim 7 wherein said magnesium oxide consists essentially of between about 1.5 and and about 35 weight percent.

10. The dielectric of claim 7 wherein said calcium oxide consists essentially of between about 1.5 and about 3 weight percent.

11. The dielectric of claim 7 wherein the dielectric constant is between about 12 and about 20.

12. The dielectric of claim 7 wherein said rare element is selected from the group consisting of niobium, neodymium and mixtures thereof.

13. The dielectric of claim 7 wherein said base material consists essentially of about 32.7 weight percent magnesium oxide, about 36.1 weight percent titanium oxide, about 2.4 weight percent calcium oxide, about 3.8 weight percent alumina, about 15.0 weight percent silica, about 1.4 weight percent niobium oxide and about 0.6 weight percent neodymium oxide and wherein said frit component comprises about 5 to about 10 weight percent zinc oxide, from about 5 to about 10 weight percent silicon dioxide, from about 9 to about 15 weight percent boron oxide, from about 35 to about 45 weight percent lead oxide, from about 15 to about 25 weight percent bismuth trioxide and from about 10 to about 19 weight percent cadmium oxide.

14. The dielectric of claim 13 wherein the temperature compensation from −55° C. to +125° C. is less than 30 ppm/C° and the dielectric constant is about 16.

15. The dielectric of claim 7 in the form of a capacitor with electrodes of about 70 percent silver and about 30 percent palladium.

16. The dielectric of claim 15 wherein said capacitor is a multilayer capacitor.

17. A method of making a temperature compensating dielectric ceramic which comprises (a) mixing about 91 to about 93 weight percent of a base ceramic composition comprising, based on total dielectric ceramic weight, about 28 to about 36 weight percent magnesium oxide, about 31 to about 39 weight percent titanium oxide, about 1 to about 4 weight percent calcium oxide, about 3 to about 5 weight percent alumina, about 12 to about 16 weight percent silica and about 1 to about 3 weight percent of the oxide of at least one rare element selected from the group consisting of niobium, neodymium, tantalum, lanthanum, yttrium and praseodymium; (b) milling said base ceramic preparation with about 7 to about 9 weight percent of a glass frit; (c) firing the mixture of said base ceramic preparation and said glass frit at a temperature below about 1150° C.

18. The method of claim 17 wherein said magnesium oxide comprises between about 31 and about 35 weight percent.

19. The method of claim 17 wherein said calcium oxide comprises between about 1.5 and about 3 weight percent.

20. The method of claim 17 wherein said rare element is selected from the group consisting of niobium, neodymium and mixtures thereof.

21. The method of claim 17 wherein said glass frit comprises about 5 to about 10 weight percent zinc oxide, from about 5 to about 10 weight percent silicon dioxide, from about 9 to about 15 weight percent boron oxide, from about 35 to about 45 weight percent lead oxide, from about 15 to about 25 percent bismuth trioxide, and from about 10 to about 19 weight percent cadmium oxide.

22. The method of claim 17 further comprising forming an electrode of about 70 percent silver and about 30 percent palladium onto said dielectric during firing of said mixture.

23. The method of claim 21 wherein said firing is at between about 1110° C. and about 1120° C.

24. The method of claim 17 wherein said base material comprises about 32.7 weight percent magnesium oxide, about 36.1 weight percent titanium oxide, about 2.4 weight percent calcium oxide, about 3.8 weight percent alumina, about 15.0 weight percent silica, about 1.4 weight percent niobium oxide, and about 0.6 weight percent neodymium oxide, and wherein said frit comprises about 5 to about 10 weight percent zinc oxide, from about 5 to about 10 weight percent silicon dioxide, from about 9 to about 15 weight percent boron oxide, from about 35 to about 45 weight percent lead oxide, from about 15 to about 25 weight percent bismuth trioxide and from about 10 to about 19 weight percent cadmium oxide.

* * * * *